April 25, 1939.　　　C. W. COOPER　　　2,156,052
LOGGING DEVICE
Filed April 19, 1937　　　3 Sheets-Sheet 1
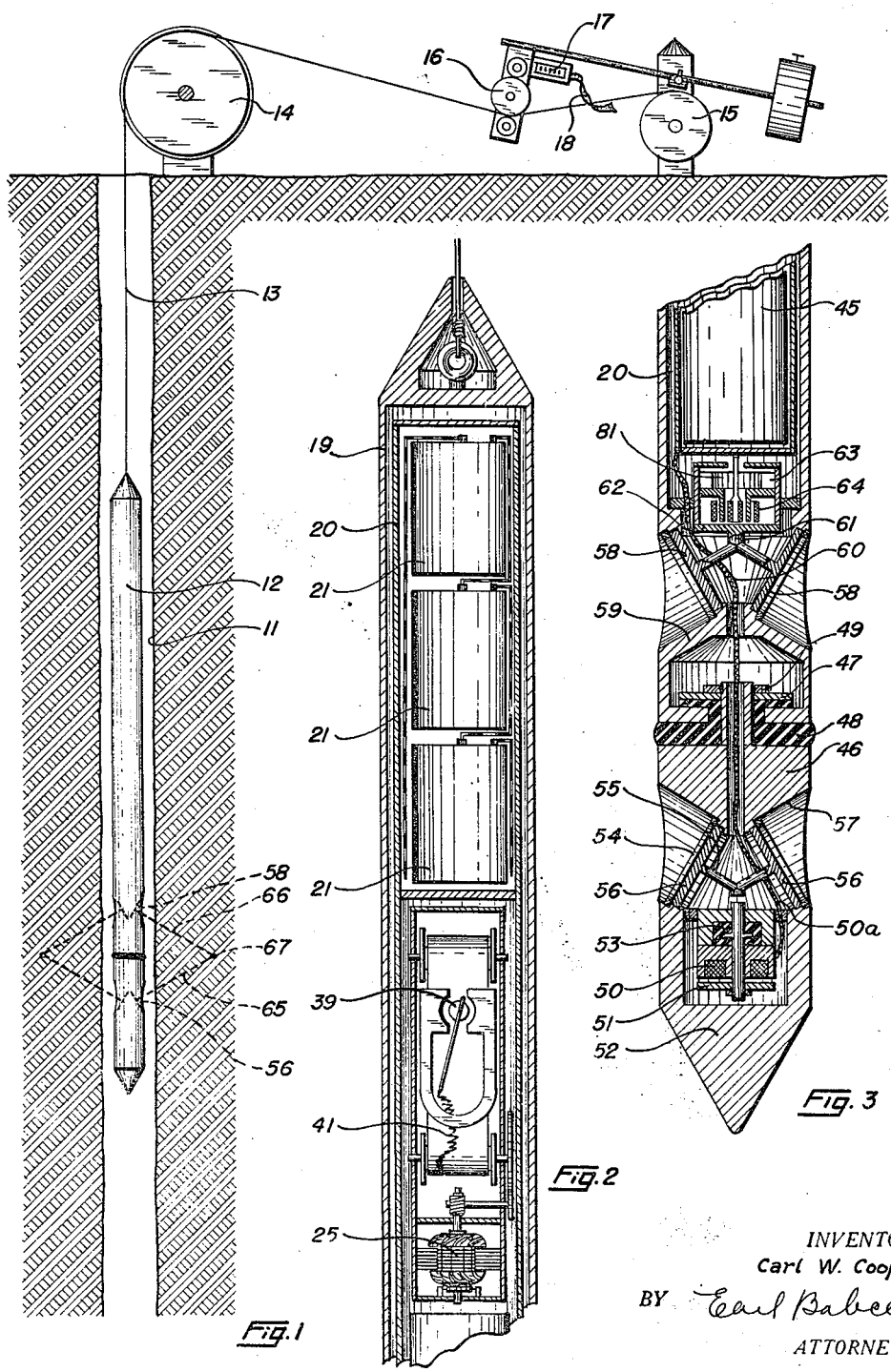
INVENTOR.
Carl W. Cooper.
BY Earl Babcock.
ATTORNEY April 25, 1939.  C. W. COOPER  2,156,052
LOGGING DEVICE
Filed April 19, 1937  3 Sheets-Sheet 2

INVENTOR.
Carl W. Cooper.
BY Earl Babcock
ATTORNEY

April 25, 1939.  C. W. COOPER  2,156,052
LOGGING DEVICE
Filed April 19, 1937  3 Sheets-Sheet 3

INVENTOR.
Carl W. Cooper.
BY Earl Babcock.
ATTORNEY

Patented Apr. 25, 1939

2,156,052

UNITED STATES PATENT OFFICE 2,156,052

LOGGING DEVICE

Carl W. Cooper, Duncan, Okla., assignor to Halliburton Oil Well Cementing Company, Duncan, Okla.

Application April 19, 1937, Serial No. 137,835

2 Claims. (Cl. 181—0.5)

This invention relates to the logging of the formation of an oil well or the like and more particularly to the determination of the character of the formation or materials around a well by means of sound vibrations impressed thereon.

Methods and apparatus for logging a well by electrical means in which some electrical property of the rock or formation of the well is measured are well known. Disadvantages in electrically logging a well result from the fact that the well may be full of fluid or may be cased with an iron pipe so that it is difficult to contact the rock itself or to obtain electrical characteristics of the same independently of the fluid in the well or the casing.

In accordance with the present invention, it is proposed to obviate these disadvantages by setting up a sound or vibration in fluid in the well, causing this sound or vibration to flow through the fluid in the well and, if the well is cased, through the casing thereof and into the rock or formation around the well and then measure certain characteristics of this sound or vibration to determine the nature of the formation. It is proposed to record the measurements thus made and thus obtain a log showing the nature of the formation at various depths in the well.

In the co-pending application of Carl W. Cooper, Serial No. 148,086, filed June 14, 1937, for "Apparatus for logging wells," various types of sounding and pick-up devices suitable for use in logging an oil well are shown, described and claimed. The present application is concerned with the combination of the sounding and pick-up devices with a recording apparatus and with the method of obtaining a log involving the use of sound or vibrations.

It is one object of the invention to devise means for logging a well in which sound is employed as a medium for determining the nature of the formation or material around a well.

It is another object of the invention to devise a sounding pick-up and recording apparatus which is so constructed that it can be lowered into an oil well as a unit and make a record of the nature of the formations around the well.

It is a further object to provide a new method of logging wells in which a record is obtained of certain characteristics of sound or vibrations effected by the formations of an oil well.

Other objects and advantages reside in certain novel features of the arrangement and method as will be more apparent from the following description taken in connection with the accompanying drawings, in which:

Figure 1 is a vertical cross-sectional view of a portion of an oil well showing the complete logging assembly associated therewith, the main portion of the apparatus being suspended in the well by means of a cable;

Figure 2 is a vertical cross-sectional view of the upper portion of the logging unit of Figure 1 and showing one form of recording apparatus constructed in accordance with the present invention mounted therein;

Figure 3 is a vertical cross-sectional view of the lower portion of the logging unit of Figure 1, the view showing details of sound sending and receiving apparatus constructed in accordance with the present invention, Figures 2 and 3 being contiguous;

Figure 4:
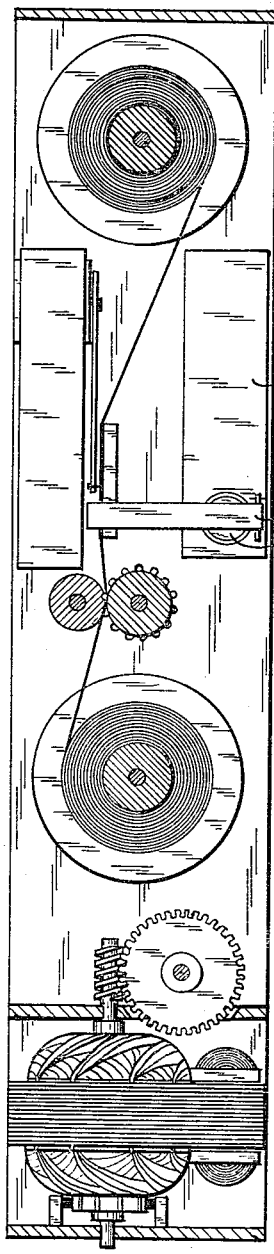
Figure 4 is an enlarged view of the recording apparatus shown in Figure 2.

Referring to the drawings in detail, and first to the arrangement of Figure 1, it will be seen that an oil well is there illustrated at 11. Within the well the logging unit 12 is located, this unit being supported by means of a wire or cable 13 which passes over a sheave 14 at the top of the well and thence to a measuring and reeling device which may be similar to the measuring apparatus shown in the U. S. patent to Halliburton, No. 1,692,037, patented November 20, 1928, for "Well sounding device". In Figure 1 this measuring apparatus is indicated diagrammatically as including a reel 15, a measuring wheel 16 and a recording depth meter 17. The recording meter 17 may include suitable clockwork for recording on the tape 18 the depth of the logging unit 12 at any instant of time.

The present invention is concerned primarily with the apparatus of the logging unit 12 itself as shown in detail in Figures 2, 3, 4 and 5.

As shown in these figures, the logging unit includes a suitable casing 19 which is of general cylindrical shape and which is preferably made of steel or other strong metal so as to withstand the high fluid pressures encountered in a well. The various portions of the casing 19 may be made up by welding or threading together pieces of pipe, to provide a hermetically sealed construction, but for convenience in illustrating the connections are not shown. The upper end of the casing is preferably provided with tapered or conical closure so as to prevent, as far as possible, the unit from becoming lodged or stuck in the well.

The casing 19 should preferably not be over three and one-half inches in diameter so that it can be lowered into any conventional size oil well. For this reason the apparatus has to be constructed so that it can be mounted within a small diameter. The casing may be of sufficient length to enclose a microphone or pick-up unit, the electrical amplifying apparatus, the recorder and a source of power, such as a battery or number of dry cells.

To mount the electrical amplifier, the recorder and the battery, a supporting frame or inner casing 20 is provided as shown in Figures 2 and 3, this frame being adapted to be placed in the upper portion of the casing 19. The supporting structure 20 may consist essentially of aluminum tubing or other light weight material with portions cut away to reduce weight and provide a convenient framework, and may be provided with brackets or supporting devices which are not shown in detail in the drawings. Within the upper portion of the supporting structure 20, three dry cells 21 having two volts each are mounted and are connected in series. This battery constitutes the source of power for the electrical apparatus in the system.

Figure 5:
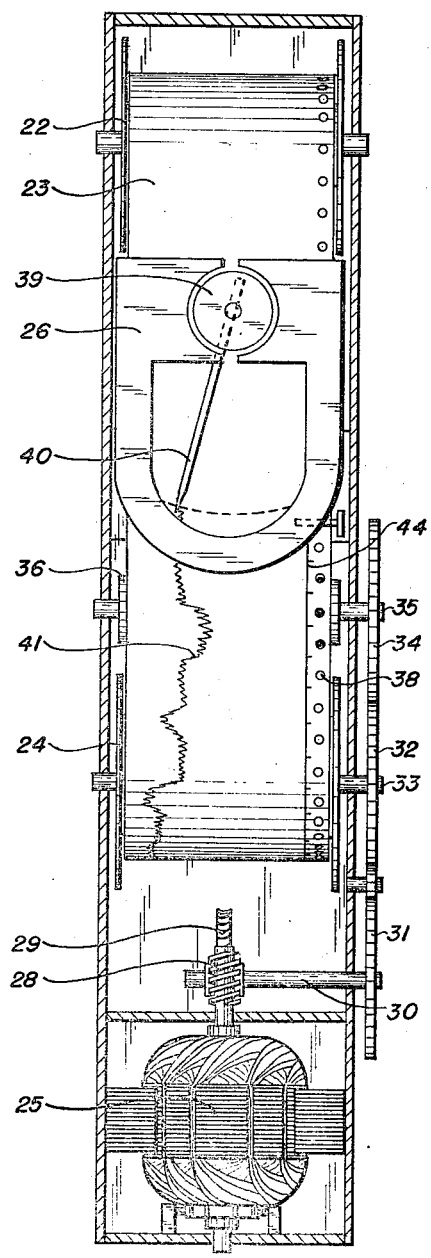
Figure 5 is an enlarged front view of the recording apparatus shown in Figure 2.

Mounted within the supporting structure 20 beneath the battery is a recording unit shown in detail in Figures 4 and 5. This recording unit may consist of an upper rotatable spool 22 having a strip of paper 23 thereon, a lower spool 24, an electrical motor 25 for winding the paper 23 from the spool 22 onto the spool 24, a galvanometer 26, and a clock work 27 for marking the tape or paper 23 at specified intervals of time. The electric motor 25 is connected by means of suitable gearing such as the worm gears 28 and 29, the shaft 30 and the bevel gears 31 and 32 to the shaft 33 of the spool 24. A suitable slippage clutch, not shown, is connected between the shaft 33 and the spool 24 so that a constant strain is placed upon the paper 23 no matter how much paper is wound upon the spool 24. The motor 25 will run at a substantially uniform speed and means may be provided for causing the paper to be moved at a fairly uniform rate thereby. Such means is illustrated in the drawings as consisting of a wheel 34, geared to the pinion 32, the wheel 34 driving a shaft 35 which carries a roller 36 having pins 37 thereon adapted to mesh with holes 38 in the paper. The roller 36 will thus control the speed of the paper, whereas the spool 24 will merely place a tension thereon. The galvanometer 26 may be of known construction in which the armature 39 actuates a pointer or stylus 40 which traces or marks upon the paper 23 as indicated for example by the graph 41 in Figure 5. In addition, the paper is also marked with a suitable time line. This may be accomplished by means of the clock work 27 which may be provided with a solenoid and a switch the circuit of which is closed at suitable intervals of time say, for example, every four seconds, so that the solenoid is energized. The core or armature of the solenoid shown at 42 in Figure 4 may actuate a pivoted lever 43 to place a mark upon the paper 23 like that shown for example at 44 in Figure 5. In this way the position of the stylus 40 at any instant of time may be determined from the chart drawn upon the paper 23.

Beneath the recording unit the supporting structure 20 carries the electrical amplifying and power unit consisting of a number of vacuum tubes, resistances, transformers, condensers and vibrators the purpose of which will presently be described and which are all mounted in a box 45 in any suitable manner. Since this apparatus is more or less conventional and since it can be mounted in a variety of ways, it will not be described in detail herein other than by means of the electrical diagram of Figure 6. The box or container 45 which houses this apparatus may be of sufficient length to provide space for the electrical apparatus but, of course, should be as compact as possible.

As best shown in Figure 3, the lower end of the casing 19 contains the pick-up or sound receiving device and supports the sound sending device. The sound sending or vibrating unit preferably consists of a body of metal 46 having a tapered lower end and a threaded projecting stud 47 at its upper end. This body 46 is connected to the lower end of the casing 19 through a rubber washer 48 and a clamping means 49. Thus, any vibration set up in or adjacent the body 46 will not be transmitted directly to the casing 19, the washer 48 acting as a dampener. The stud 47 is hollow so that electrical wires may be passed through the means connecting the body 46 to the casing 19.

The electrical vibrator per se is preferably mounted in the lower end of the body 46. It consists of an electro-magnet 50 having an armature 51 extending across its pole faces. The armature 51 is integral with a hammer 52 which is preferably mounted in a block of rubber 53 which not only serves as a resilient support but also as a dampener to prevent the hammer from chattering. The hammer 52 strikes upon an anvil 54 which is connected by means of a yoke 55 to two diametrically opposed diaphragms 56. The rims of these diaphragms are rigidly secured to the walls of the vibrator unit 46 in recesses or holes 57 bored transversely and at an angle therein. Thus any sound or vibration set up in the diaphragms 56 by the electromagnet will be transmitted outwardly and upwardly on diametrically opposed sides of the unit 46. The diaphragms 56 and the recesses 57 may thus be called sound directing means.

The pick-up for the vibrations set up as just previously described is mounted in the lower end of the casing 19. It consists of two diaphragms 58 mounted in recesses or holes 59 similar to the holes 57 in the vibrator unit except that they are directed downwardly instead of upwardly. The diaphragms 58 are connected by means of a yoke 60 and a connector 61 to a flexible diaphragm 62 of a microphone consisting essentially of a permanent magnet 63 and a pair of coils 64. The diaphragms 58 and the recesses 59 serve to concentrate the sound upon the pick-up or microphone and may thus be called sound collecting means.

The diaphragms 56 and 58 must be of rugged construction and of sufficient thickness to withstand the high pressure which will be encountered in deep wells.

As best shown in Figure 1, the diaphragms 56 and 58 are disposed at the proper angle and the proper distance apart to be particularly responsive to echo or rebound effects resulting from the transmission of the vibration into the formation around the well and back again. In theory, the sound or vibration set up on the diaphragms 56 will be transmitted out into the formation a pre-determined distance and then be reflected back onto the diaphragms 58. The maximum effect of these vibrations upon the diaphragms 58 will depend upon the reflecting power of the formation at the point where vertical lines 65 and 66 through the diaphragms meet. Vibrations will of course be transmitted or reflected onto the diaphragms 58 other than along the lines illustrated in Figure 1 but the maximum effect of the vibrations upon the diaphragms 58 will be as illustrated and will depend upon the nature of the formation at the point of intersection 67 of these lines. The point of intersection 67 may be any desired distance out into the formation from the center of the well, depending upon how far the diaphragms 56 and 58 are apart and depending upon the angle at which these diaphragms are mounted with respect to the vertical center of the well. In an experimental apparatus which has been constructed, the diaphragms have been disposed at a 30 degree angle from the vertical and spaced apart such a distance that the theoretical points of intersection 67 are about 15 inches from the center line of the well.

The microphone shown in Figure 3 is connected to the galvanometer 26 through suitable amplifying apparatus which will now be described in connection with the electrical circuits of Figure 6.

Figure 6:
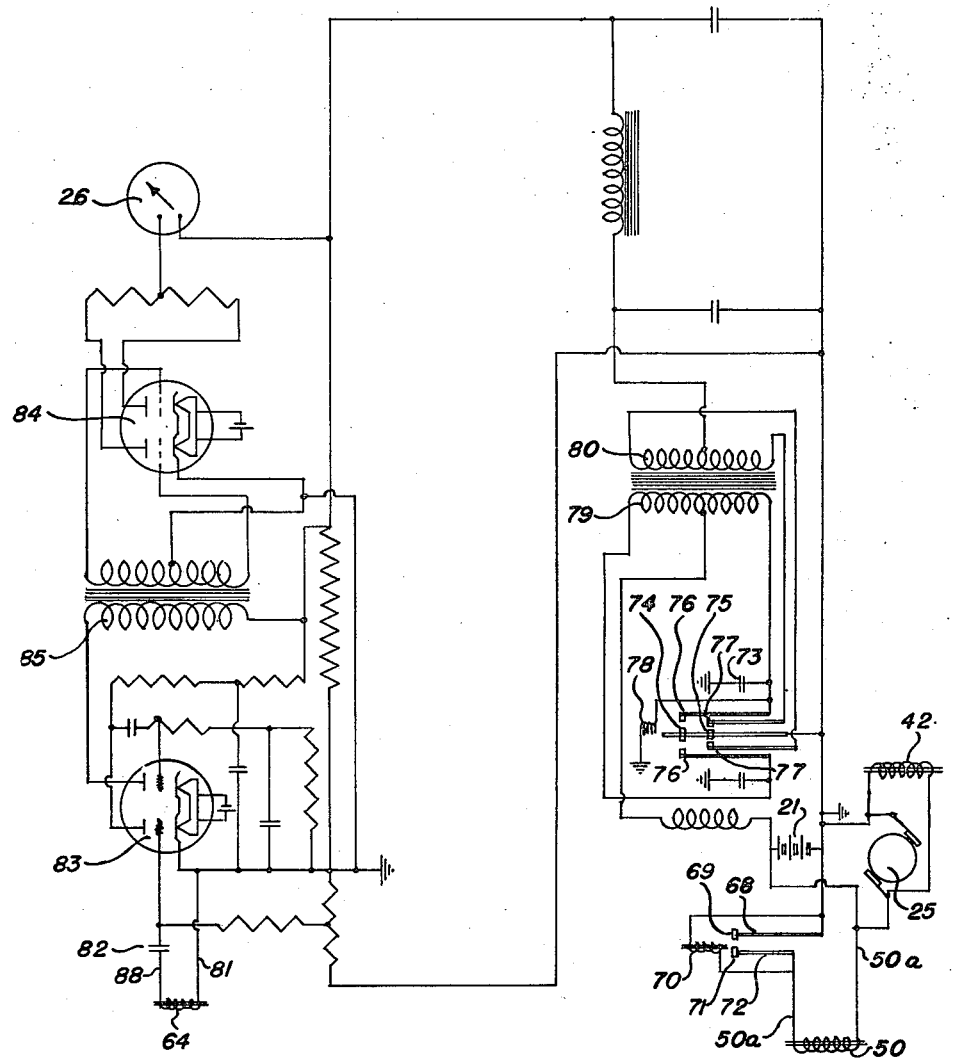
Figure 6 is a diagram of the electrical apparatus used in the arrangement of Figures 1, 2 and 3.

In Figure 6 the parts which have been previously described are similarly designated. Thus the battery is indicated at 21, the motor which drives the recording apparatus at 25, the solenoid which marks time intervals on the tape at 42, the electro-magnet for the vibrating unit at 50 and the coil of the microphone at 64.

The battery 21 providing a source of direct current, a vibrator or interrupter must be used to cause pulsating or alternating current to be transmitted to the electro-magnet 50 of the vibrating unit. In Figure 6 such a vibrator is shown at 68. This may be of a known construction consisting of a vibrating reed having a contact 69 thereon adapted upon the energization of the actuating coil 70 to touch a contact 71 carried by a leaf spring 72. This sets up pulsating current in the coil 50, which is connected to the interrupter and battery by conductors 50a.

The amplifying unit includes two radio tubes together with suitable transformers, resistors and condensers. In order to supply the proper voltages to the amplifying unit, a power unit of more or less conventional design is provided. The power unit includes an interrupter and rectifier consisting for example of a vibrating reed 73 carrying contacts 74 and 75 adapted to touch contacts 76 and 77. The reed 73 may be actuated by means of a coil 78. In this way pulsations from the battery 21 are transmitted through the contacts 74 and 76 to the primary 79 of a transformer, the secondary 80 of which is connected to the rectifier contacts 75 and 77. In this way the direct current voltage of the battery 21 may be stepped up to a direct current voltage suitable for the plate voltage on the vacuum tubes of the amplifier unit. Suitable choke coils and condensers may be connected into this circuit illustrated to filter out ripples and undesirable fluctuations.

As shown at the left hand side of Figure 6 the amplifier unit is connected to the microphone coils 64 and to the galvanometer 26. Conductors 81 connect the microphone coils 64 to the amplifying apparatus, a small condenser 82 being provided to block out any direct current in the coil 64. The first vacuum tube 83 of the circuit is part of a voltage amplifier. This tube may be a double triode of the type referred to in the trade as 6N7. The coil 64 is connected to the elements thereof as shown and suitable resistors and condensers connected thereto as illustrated to make up a two-stage voltage amplifier. The second vacuum tube 84 forms part of what is called a Class B amplifier, the plates of which are connected to the galvanometer 26 and the plate current of which varies according to the grid voltage input variation. The output of the voltage amplifier circuit, which includes the tube 83, is connected to the tube 84 by means of the transformer 85. The filaments of the tubes 83 and 84 which heat the cathodes may be supplied with current from the battery 21 directly, but for convenience in illustration separate small batteries have been illustrated.

In logging a well with the apparatus described, the logging unit will be lowered into the well at any convenient speed. The vibrator will operate continuously and send out sound vibrations from the diaphragms 56 which will be picked up on the diaphragms 58 and electrically recorded upon the tape 23. Since the vibrator will operate at practically a constant frequency and at practically a constant volume, sound vibrations of essentially the same characteristic will be impressed upon the formation all during the logging operation. The rebound or echo effects upon the diaphragms 58 will vary, however, depending on the nature of the formation. Limestone or hard rock will cause a greater rebound or echo effect than soft shales or other formations. There will also be a marked difference in the volume of the rebound or echo effect between formations containing oil or water and non-fluid bearing formations. Also, fluid bearing formations themselves can be distinguished one from another, depending upon the nature of the fluid therein, after experience in reading the chart has been gained.

The apparatus may be used to log cased holes as well as open holes, inasmuch as the casing itself, while affecting the transmission of the sound vibrations to and from the formations, will have no different effect at one level than at another, except perhaps at the joints, which will be at regular intervals on the chart and easily identified. The same is also true where the hole is full of mud or other fluid, partly due to the fact that the mud will have a fairly constant consistency from top to bottom and also due to the fact that the vibrator and pickup unit are so designed as to eliminate to some extent all effects except those due to the nature of the formation spaced some distance radially from the center of the well.

After the logging unit has been lowered to the bottom of the well and removed therefrom, it may be necessary to correlate the record obtained in the unit with the record obtained on the depth measuring chart to determine the nature of the formation at any particular depth and in this way very desirable data on the nature of the well can be determined. This correlation may not be necessary in all cases, however. For example, if a cased hole is being logged, the joints of casing may be indicated on the chart and the depth determined in this way. Also, the unit may be held stationary at suitable intervals of depth, say, 100 feet, for a few seconds so that straight lines are periodically drawn on the chart which can be counted to determine approximate depth at any point on the chart.

The logging of a well by means of sound or vibration may be carried out with the recorder at the surface so that a chart can be obtained while the apparatus is in the well.

Where "sound vibrations" are referred to herein, any audible frequency, as well as frequencies above or below the audible range are meant, provided they are capable of measurement or detection, with apparatus of the type disclosed.

While only one embodiment of the invention has been shown and described herein, it is obvious that various changes may be made in the apparatus and method without departing from the spirit of the invention or the scope of the annexed claims.

I claim:

1. Apparatus for logging a well including sound producing means, sound pick-up means and a recorder, said sound producing means and said apparatus including a unitary construction adapted to be lowered into the well and having said sound pick-up means therein, said sound producing means having sound directing means associated therewith to cause the passage of sound vibrations into the formation of the well and said sound pick-up means having sound collecting means associated therewith to cause the sound pick-up means to be particularly responsive to the echo or rebound of the vibrations from the formations of the well.

2. Apparatus for logging a well including a supporting member, sound producing means, sound pick-up means and a recorder, said sound producing means including two diaphragms, located on diametrically opposite sides of the supporting member and inclined with respect to the vertical center-line of the same, said sound pick-up means including two diaphragms located on diametrically opposite sides of said supporting member at a fixed distance longitudinally from said sound producing diaphragms, said sound pick-up diaphragms being also inclined with respect to the vertical center-line of the supporting member, the inclination of the diaphragms being such as to cause the pick-up means to be particularly responsive to echo or rebound effects of sound sent a predetermined distance into the formation of the well by said sound producing means, and said recorder being connected to said pick-up means to record variations in the nature of the formation at said predetermined distance from the well.

CARL W. COOPER.

CERTIFICATE OF CORRECTION.

Patent No. 2,156,052.   April 25, 1939.

CARL W. COOPER.

It is hereby certified that error appears in the printed specification of the above numbered patent requiring correction as follows: Page 4, first column, line 21, claim 1, strike out the words "sound producing means and said" and insert the same after "said", first occurrence, in line 24, same claim; and that the said Letters Patent should be read with this correction therein that the same may conform to the record of the case in the Patent Office.

Signed and sealed this 11th day of July, A. D. 1939.

Henry Van Arsdale (Seal.)   Acting Commissioner of Patents.